US010919403B2

(12) United States Patent
Ge et al.

(10) Patent No.: US 10,919,403 B2
(45) Date of Patent: Feb. 16, 2021

(54) CHARGING PILE SYSTEM WITH A PLURALITY OF CHARGING PILES SWITCHABLE IN SERIES AND PARALLEL

(71) Applicant: Huawei Technologies Co., Ltd., Shenzhen (CN)

(72) Inventors: Jing Ge, Shenzhen (CN); Xingjie Wang, Dongguan (CN); Yongjin Lin, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/521,086

(22) Filed: Jul. 24, 2019

(65) Prior Publication Data

US 2019/0344682 A1    Nov. 14, 2019

Related U.S. Application Data

(63) Continuation of application No. PCT/CN2018/073202, filed on Jan. 18, 2018.

(30) Foreign Application Priority Data

Jan. 25, 2017 (CN) .......................... 201710056257.2

(51) Int. Cl.
*H02J 7/00* (2006.01)
*B60L 53/14* (2019.01)
(Continued)

(52) U.S. Cl.
CPC ............... *B60L 53/14* (2019.02); *B60L 53/31* (2019.02); *B60L 53/60* (2019.02); *H02J 7/00* (2013.01); *H02J 7/0024* (2013.01); *B60L 53/67* (2019.02)

(58) Field of Classification Search
CPC .......... B60L 53/67; B60L 53/14; B60L 53/31; B60L 53/11; B60L 53/60
(Continued)

(56) References Cited

U.S. PATENT DOCUMENTS 3,886,426 A * 5/1975 Daggett .................. B60L 15/04
320/117
4,134,057 A * 1/1979 Portmann ............... H02M 3/07
320/102
(Continued)

FOREIGN PATENT DOCUMENTS

CN    104092266 A    10/2014
CN    105119334 A    12/2015
(Continued)

OTHER PUBLICATIONS

Machine Translation and Abstract of Chinese Publication No. CN104092266, Oct. 8, 2014, 17 pages.
(Continued)

*Primary Examiner* — John T Trischler
(74) *Attorney, Agent, or Firm* — Conley Rose, P.C.

(57) ABSTRACT

A charging pile system comprising a system input bus, charging pile circuit groups, a controller, a power allocation unit, and charging terminals. The power allocation unit comprises a first switch group, a second switch group, and a third switch group. The first switch group comprises first switching devices, the second switch group comprises second switching devices, and the third switch group comprises third switching devices. The first switching devices are coupled to respective output ends of the charging pile circuit groups so as to configure at least two idle charging pile circuit groups to be coupled either in series or in parallel to provide a first output. Each of the second switch group and the third switch group is configured to couple an input end
(Continued)

of any of the charging terminals in series or in parallel to provide a second output to the charging pile circuit groups.

16 Claims, 8 Drawing Sheets

(51) Int. Cl.
*B60L 53/31* (2019.01)
*B60L 53/60* (2019.01)
*B60L 53/67* (2019.01)

(58) Field of Classification Search
USPC .......................................... 320/107, 117, 109
See application file for complete search history.

(56) References Cited

U.S. PATENT DOCUMENTS

| | | | | |
|---|---|---|---|---|
| 4,139,812 A * | 2/1979 | Huggins | H02J 7/0024 320/117 |
| 4,274,043 A * | 6/1981 | Heitz | H01M 10/4207 307/151 |
| 5,225,761 A * | 7/1993 | Albright | H02J 7/1423 320/117 |
| 5,369,351 A * | 11/1994 | Adams | A61N 1/378 320/121 |
| 5,461,264 A * | 10/1995 | Yang | H02M 3/158 307/81 |
| 5,734,205 A * | 3/1998 | Okamura | H02J 7/0024 307/110 |
| 5,744,936 A * | 4/1998 | Kawakami | H01M 10/4207 320/120 |
| 5,747,966 A * | 5/1998 | Minamoto | H02J 7/0024 320/124 |
| 6,031,355 A * | 2/2000 | Rich | H01M 10/0445 320/117 |
| 6,034,506 A * | 3/2000 | Hall | H02J 7/0019 320/101 |
| 6,268,710 B1 * | 7/2001 | Koga | H02J 7/0021 320/116 |
| 6,323,623 B1 * | 11/2001 | Someya | H02J 7/0021 320/121 |
| 6,326,768 B2 * | 12/2001 | Nagai | H02J 7/0013 320/116 |
| 6,337,555 B1 * | 1/2002 | Oh | H01M 10/441 320/107 |
| 6,351,097 B1 * | 2/2002 | Oh | H01M 10/441 320/107 |
| 6,430,692 B1 * | 8/2002 | Kimble | G06F 1/263 307/66 |
| 6,580,249 B2 * | 6/2003 | Yau | H02J 7/0022 320/122 |
| 6,885,170 B2 * | 4/2005 | Okamura | H02J 7/0016 320/117 |
| 7,423,391 B2 * | 9/2008 | Oyobe | H02M 7/797 180/65.31 |
| 7,516,726 B2 * | 4/2009 | Esaka | H02J 7/0024 123/179.3 |
| 7,692,404 B2 * | 4/2010 | Harris | B60L 7/14 320/117 |
| 7,710,067 B2 * | 5/2010 | Kosaka | H02J 7/0024 318/812 |
| 7,723,954 B2 * | 5/2010 | Frucht | H02J 7/0024 320/117 |
| 7,808,207 B1 * | 10/2010 | Chang | H01M 10/441 320/117 |
| 7,898,223 B2 * | 3/2011 | Takeda | H02M 3/07 320/117 |
| 7,962,212 B2 * | 6/2011 | Signoff | A61N 1/378 320/121 |
| 8,310,177 B2 * | 11/2012 | Naumann | B25F 5/00 318/105 |
| 8,330,419 B2 * | 12/2012 | Kim | H01M 10/4207 320/121 |
| 8,427,083 B2 * | 4/2013 | Warmenhoven | H02K 53/00 180/165 |
| 8,427,106 B2 * | 4/2013 | Kim | H01M 10/482 320/121 |
| 8,643,340 B1 * | 2/2014 | Kamath | H02M 3/07 257/499 |
| 8,716,894 B2 * | 5/2014 | Uno | H02J 7/0014 307/77 |
| 8,816,613 B2 * | 8/2014 | Lee | H02J 7/0024 318/140 |
| 8,860,371 B2 * | 10/2014 | Yang | H02J 2207/40 320/116 |
| 8,890,474 B2 * | 11/2014 | Kim | B60L 3/003 320/109 |
| 8,928,174 B2 * | 1/2015 | Muto | H02J 7/0024 307/71 |
| 8,957,610 B2 * | 2/2015 | Lee | B60L 50/66 318/139 |
| 8,994,331 B2 * | 3/2015 | Kerfoot, Jr. | H01M 10/44 320/117 |
| 9,024,585 B2 * | 5/2015 | Nakashima | H02J 7/0019 320/117 |
| 9,054,536 B2 * | 6/2015 | Wang | H02J 7/0024 |
| 9,083,187 B2 * | 7/2015 | Ito | H02J 7/0014 |
| 9,099,937 B2 * | 8/2015 | Tamai | H02M 7/487 |
| 9,156,322 B2 * | 10/2015 | Kanamori | B60D 7/00 |
| 9,168,841 B2 * | 10/2015 | Kawai | B60L 53/11 |
| 9,172,254 B2 * | 10/2015 | Ganor | H02J 7/00 |
| 9,231,442 B2 * | 1/2016 | Senba | H02J 13/00 |
| RE45,897 E * | 2/2016 | Naumann | B25F 5/00 |
| 9,276,422 B2 * | 3/2016 | Hotta | H01M 10/425 |
| 9,401,658 B2 * | 7/2016 | Bao | H02M 7/17 |
| 9,450,274 B2 * | 9/2016 | Vo | H02J 7/0024 |
| 9,496,799 B2 * | 11/2016 | Goetz | H02M 3/158 |
| 9,543,767 B2 * | 1/2017 | Wada | B60L 58/19 |
| 9,574,279 B2 * | 2/2017 | Mata | H01M 8/04201 |
| 9,667,139 B2 * | 5/2017 | Giuliano | H02M 3/158 |
| 9,743,159 B2 * | 8/2017 | Hsieh | H04Q 9/00 |
| 9,910,471 B1 * | 3/2018 | Marr | G06F 1/30 |
| 9,917,460 B2 * | 3/2018 | Koenen | H02J 7/0024 |
| 9,969,273 B2 * | 5/2018 | Rozman | B60L 15/007 |
| 10,059,217 B2 * | 8/2018 | Min | B60L 58/22 |
| 10,074,997 B2 * | 9/2018 | Vo | H02J 7/0016 |
| 10,084,325 B2 * | 9/2018 | Kufner | H02J 7/34 |
| 10,106,110 B1 * | 10/2018 | Ganiere | B60R 16/03 |
| 10,193,359 B2 * | 1/2019 | Ganor | B60L 58/18 |
| 10,230,249 B2 * | 3/2019 | Ozawa | H02J 7/0019 |
| 10,300,802 B2 * | 5/2019 | Katayama | B60L 53/31 |
| 10,305,298 B2 * | 5/2019 | Kristensen | H02J 7/0026 |
| 10,320,204 B2 * | 6/2019 | Ishikawa | H02J 7/0016 |
| 10,391,870 B2 * | 8/2019 | Gotz | B60L 53/62 |
| 10,427,547 B2 * | 10/2019 | Syouda | B60L 58/19 |
| 10,439,407 B2 * | 10/2019 | Gotz | H02J 7/0027 |
| 10,498,148 B2 * | 12/2019 | Mergener | H02J 7/0019 |
| 10,498,274 B2 * | 12/2019 | Gieras | H02K 1/165 |
| 2003/0128013 A1 * | 7/2003 | Okamura | H02J 7/0016 320/166 |
| 2005/0052154 A1 * | 3/2005 | Kavounas | H02J 7/0024 320/116 |
| 2005/0212493 A1 * | 9/2005 | Yamaguchi | H02J 7/0024 320/166 |
| 2007/0052295 A1 * | 3/2007 | Frucht | H02J 7/0024 307/66 |
| 2008/0030165 A1 * | 2/2008 | Lisac | H02P 27/00 320/103 |
| 2008/0072859 A1 * | 3/2008 | Esaka | H02J 7/0024 123/179.3 |
| 2009/0042073 A1 * | 2/2009 | Kim | H01M 8/04932 429/414 |
| 2009/0085553 A1 * | 4/2009 | Kumar | H01M 10/425 323/351 |
| 2009/0128158 A1 * | 5/2009 | Kawai | B60L 3/0046 324/433 |
| 2009/0134851 A1 * | 5/2009 | Takeda | H02M 3/07 323/234 |

(56) References Cited

U.S. PATENT DOCUMENTS

| | | | |
|---|---|---|---|
| 2010/0261043 A1* | 10/2010 | Kim | B60L 58/19 429/61 |
| 2010/0261048 A1* | 10/2010 | Kim | B60L 3/0046 429/150 |
| 2011/0001456 A1* | 1/2011 | Wang | H02J 7/0016 320/117 |
| 2011/0074214 A1 | 3/2011 | Takao et al. | |
| 2011/0285345 A1* | 11/2011 | Kawai | H02J 7/0042 320/107 |
| 2011/0291616 A1* | 12/2011 | Kim | B60L 3/003 320/109 |
| 2011/0316377 A1* | 12/2011 | Warmenhoven | H02K 53/00 310/113 |
| 2012/0119582 A1* | 5/2012 | Tajima | H02J 7/0024 307/71 |
| 2012/0133310 A1* | 5/2012 | Lee | H02J 7/0024 318/139 |
| 2012/0200163 A1* | 8/2012 | Ito | H01M 10/441 307/77 |
| 2012/0256568 A1* | 10/2012 | Lee | B60L 7/14 318/139 |
| 2012/0274140 A1* | 11/2012 | Ganor | H02J 7/00 307/71 |
| 2012/0293128 A1* | 11/2012 | Kim | H02J 7/0016 320/117 |
| 2012/0319493 A1* | 12/2012 | Kim | H01M 10/482 307/80 |
| 2012/0326671 A1* | 12/2012 | Krause | H01M 10/482 320/126 |
| 2013/0093396 A1* | 4/2013 | Dien | H02J 7/0024 320/118 |
| 2013/0300370 A1* | 11/2013 | Hotta | H01M 10/425 320/117 |
| 2013/0320926 A1* | 12/2013 | Kerfoot, Jr. | H01M 10/44 320/117 |
| 2014/0015488 A1* | 1/2014 | Despesse | H01M 10/425 320/122 |
| 2014/0179164 A1* | 6/2014 | Kanamori | B60D 7/00 439/620.21 |
| 2014/0192572 A1* | 7/2014 | Tamai | H02M 7/483 363/56.12 |
| 2014/0312828 A1* | 10/2014 | Vo | H02J 7/0016 320/103 |
| 2015/0022140 A1* | 1/2015 | Heishi | H02J 7/0014 320/101 |
| 2015/0155791 A1 | 6/2015 | Bao et al. | |
| 2015/0222132 A1* | 8/2015 | Shikatani | H02J 7/007 320/117 |
| 2015/0326040 A1 | 11/2015 | Kawai et al. | |
| 2015/0365011 A1* | 12/2015 | Ilves | H02M 7/483 363/126 |
| 2016/0107533 A1 | 4/2016 | Cai et al. | |
| 2016/0176303 A1* | 6/2016 | Nelson | B60L 11/1805 307/10.1 |
| 2016/0211680 A1* | 7/2016 | Ganor | H01M 10/0445 |
| 2016/0218373 A1* | 7/2016 | Blanchard | H01M 6/5011 |
| 2016/0337722 A1* | 11/2016 | Hsieh | G01R 31/3648 |
| 2017/0047747 A1* | 2/2017 | Kufner | H02J 7/0024 |
| 2017/0054306 A1* | 2/2017 | Vo | H02J 7/0016 |
| 2017/0182902 A1* | 6/2017 | Katayama | H02J 7/00 |
| 2018/0015831 A1* | 1/2018 | Rozman | H02M 7/49 |
| 2018/0056798 A1* | 3/2018 | Syouda | B60L 53/60 |
| 2018/0131304 A1* | 5/2018 | Gieras | H02K 3/12 |
| 2018/0152032 A1* | 5/2018 | Gotz | B60L 53/11 |
| 2018/0162229 A1* | 6/2018 | Gotz | B60L 53/11 |
| 2018/0219391 A1* | 8/2018 | Ishikawa | H02J 7/0016 |
| 2018/0345806 A1* | 12/2018 | Lee | H02J 7/0024 |
| 2019/0070971 A1* | 3/2019 | Kusumi | B60L 11/1855 |
| 2019/0089169 A1* | 3/2019 | Okamura | H02J 7/0026 |
| 2019/0097436 A1* | 3/2019 | Ing | B60L 53/11 |
| 2019/0103750 A1* | 4/2019 | Kristensen | H02J 7/0026 |
| 2019/0109469 A1* | 4/2019 | Kufner | H02J 7/0024 |
| 2019/0109470 A1* | 4/2019 | Ganor | H01M 10/4207 |
| 2019/0214833 A1* | 7/2019 | Li | G01R 31/382 |
| 2019/0217734 A1* | 7/2019 | Li | B60L 53/16 |
| 2019/0337405 A1* | 11/2019 | Hou | B60L 53/16 |

FOREIGN PATENT DOCUMENTS

| | | |
|---|---|---|
| CN | 105305596 A | 2/2016 |
| CN | 105375599 A | 3/2016 |
| CN | 105946607 A | 9/2016 |
| CN | 106541842 A | 3/2017 |
| CN | 106696748 A | 5/2017 |
| CN | 106787059 A | 5/2017 |
| EP | 2815913 A1 | 12/2014 |
| WO | 2009038976 A2 | 3/2009 |

OTHER PUBLICATIONS

Machine Translation and Abstract of Chinese Publication No. CN105119334, Dec. 2, 2015, 14 pages.
Machine Translation and Abstract of Chinese Publication No. CN105375599, Mar. 2, 2016, 12 pages.
Machine Translation and Abstract of Chinese Publication No. CN105946607, Sep. 21, 2016, 17 pages.
Machine Translation and Abstract of Chinese Publication No. CN106541842, Mar. 29, 2017, 8 pages.
Machine Translation and Abstract of Chinese Publication No. CN106696748, May 24, 2017, 21 pages.
Foreign Communication From a Counterpart Application, Chinese Application No. 201710056257.2, Chinese Office Action dated Aug. 24, 2018, 5 pages.
Foreign Communication From a Counterpart Application, PCT Application No. PCT/CN2018/073202, English Translation of International Search Report dated Apr. 24, 2018, 2 pages.
Foreign Communication From a Counterpart Application, PCT Application No. PCT/CN2018/073202, English Translation of Written Opinion dated Apr. 24, 2018, 5 pages.
Machine Translation and Abstract of Chinese Publication No. CN106787059, May 31, 2017, 13 pages.
Foreign Communication From a Counterpart Application, European Application No. 18745038.2, Extended European Search Report dated Dec. 10, 2019, 9 pages.

* cited by examiner

CHARGING PILE SYSTEM WITH A PLURALITY OF CHARGING PILES SWITCHABLE IN SERIES AND PARALLEL

CROSS-REFERENCE TO RELATED APPLICATIONS

This application is a continuation application of International Application No. PCT/CN2018/073202, filed on Jan. 18, 2018, which claims priority to Chinese Patent Application No. 201710056257.2, filed on Jan. 25, 2017. The disclosures of the aforementioned applications are hereby incorporated by reference in their entireties.

TECHNICAL FIELD

The present disclosure relates to the field of electric vehicle charging technologies, and in particular, to a charging pile system.

BACKGROUND

Figure 1:
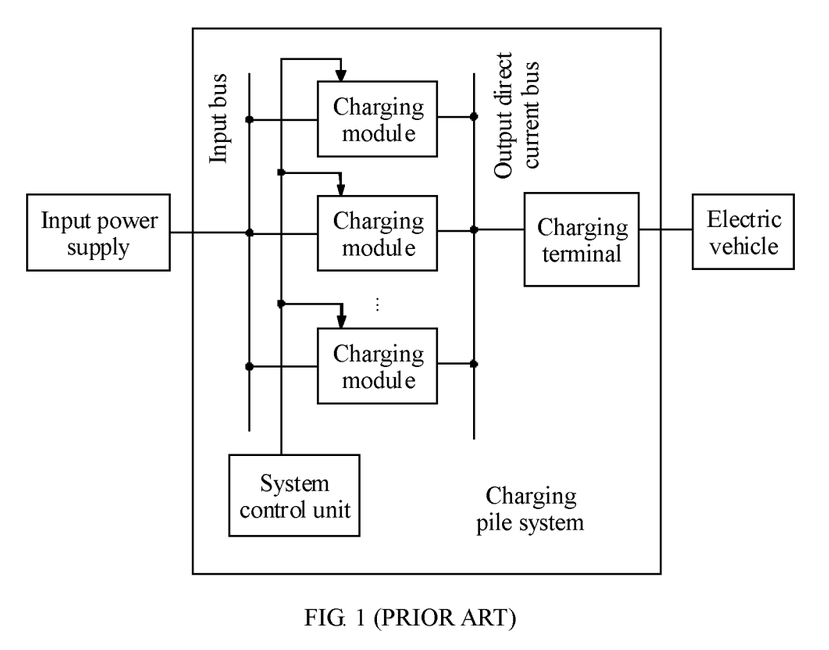
FIG. 1 is a schematic structural diagram of a typical direct current charging pile system.

A charging pile system is used to convert electric energy of a grid (including a micro-grid) into direct currents at different voltage levels and different current levels, to directly charge a battery of an electric vehicle by using a charging connection apparatus. As shown in FIG. 1, a typical direct current charging pile system generally includes components such as an input bus, a system control unit, a charging module, an output direct current bus, and a charging terminal. The input bus is configured to connect an input power supply to the charging module. The charging module is configured to convert electric energy input from the bus into a direct current of a specification required by an electric vehicle, and then charge a battery of the electric vehicle using the output direct current bus and the charging terminal.

Because electric vehicles are applied in diverse application scenarios that have different battery capacity requirements, the electric vehicles have different charging voltages, and require a wide range of charging currents. Currently, a rated voltage of a battery of a passenger vehicle is usually 150 volts (V) to 500 V, and a rated voltage of a battery of a bus is usually 400 V to 700 V. With development of batteries and charging technologies, the electric vehicle has a larger battery capacity and a higher charging rate. A charging power can be increased only by increasing a charging current or a charging voltage. However, because the increase of the charging current is limited by a current-carrying capability of a charging cable, increasing the charging voltage to improve a charging rate is a development trend accepted in the industry. Currently, voltages of a small number of electric vehicles already reach 800 V to 1000 V.

Figure 2:
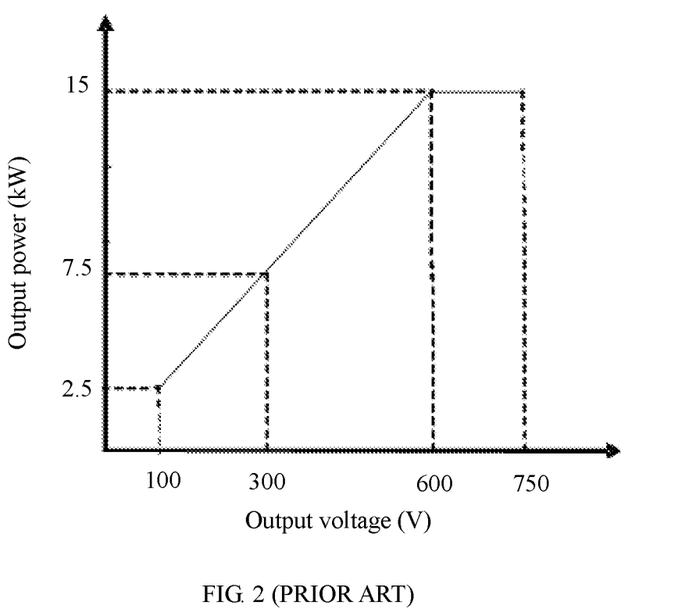
FIG. 2 is an output characteristic diagram of a charging pile module whose optimum output power performance is 750 V/15 kW.

FIG. 2 is an output characteristic diagram of a 750 V/15 kilowatt (kW) charging pile module with optimum output power performance among current common types of charging modules. It can be learned from FIG. 2 that, even the charging pile module with the optimum output power performance cannot output a constant power within an entire voltage range. A charging pile usually includes a plurality of parallel-connected modules. For example, when a rated 750 V/60 kW charging pile (including four parallel-connected modules having the output characteristic in FIG. 2) outputs 300 V for charging, a maximum power is only 30 kW. If the charging pile is to charge, at a sufficient power, an electric vehicle having a charging voltage 300 V and a charging current 200 Ampere (A), an actually required charging power is 60 kW, but a rated power of the charging pile needs to be designed as 120 kW to ensure that a system can output a 200 A current when outputting 300 V. Consequently, a charging capability is wasted. Therefore, it is difficult for the charging pile to adapt to electric vehicles having different charging voltage requirements and different charging current requirements.

SUMMARY

Embodiments of the present disclosure provide a charging pile system, to flexibly configure ranges of an output voltage and an output current of the charging pile system, and meet charging requirements of different load.

A first aspect of the embodiments of the present disclosure provides a charging pile system, including a system input bus, a plurality of charging pile module groups, a power allocation unit, and a plurality of charging terminals corresponding to the plurality of charging pile module groups. The system input bus is connected to input ends of the plurality of charging pile module groups, and output ends of the plurality of charging pile module groups are connected to input ends of the plurality of charging terminals using the power allocation unit. The power allocation unit includes a first switch group, a second switch group, a third switch group, and a controller, and each switch group includes a plurality of switching devices. The switching devices in the first switch group are connected between the output ends of the plurality of charging pile module groups, to configure at least two idle charging pile module groups of the plurality of charging pile module groups to be connected in series or parallel for output. A switching device in the second switch group separately connects the output ends of the plurality of charging pile module groups to input ends of corresponding charging terminals. The switching devices in the third switch group are connected between the input ends of the plurality of charging terminals. The second switch group and the third switch group are configured to connect an input end of any one of the charging terminals and the charging pile module groups connected in series or connected in parallel for output.

The controller is electrically connected to each of the first switch group, the second switch group, and the third switch group, to control a plurality of switching devices in the first switch group, the second switch group, and the third switch group when any one of the plurality of charging terminals requires a power greater than an output power of a corresponding charging pile module group, so that at least two idle charging pile module groups of the plurality of charging pile module groups are configured, through serial or parallel connection for output, for the charging terminal that requires a power greater than the output power of the corresponding charging pile module group.

In the charging pile system, the controller controls changing of a closing and opening combination manner of the plurality of switching devices in the first switch group, the second switch group, and the third switch group, so that the plurality of charging pile module groups are connected in series, in parallel, or in series and parallel, to provide charging currents and charging voltages with different output characteristics for at least one of the plurality of charging terminals based on different connection manners. Therefore, configuration ranges of a charging current and a charging voltage of the charging pile system can be effectively increased, so that the charging pile system can meet charging requirements of various electric vehicles having different capacities, different charging rates, and different charging voltages.

In an implementation, a positive output end of each charging pile module group is separately connected to positive output ends of a plurality of other charging pile module groups using a plurality of switching devices in the first switch group, and the positive output end of each charging pile module group is further separately connected to negative output ends of the plurality of other charging pile module groups using a plurality of switching devices in the first switch group, where a connection point that is of each switching device and is connected to a negative output end of the charging pile module group is located between the negative output end of the charging pile module group and a corresponding switching device in the second switch group.

In an implementation, the charging pile system includes N charging pile module groups and N corresponding charging terminals, a positive output end of any one of the N charging pile module groups is separately connected to positive output ends of the N−1 other charging pile module groups using N−1 switching devices, and the positive output end of the any one of the N charging pile module groups is further separately connected to negative output ends of the N−1 other charging pile module groups 130 using N−1 switching devices.

In an implementation, the negative output end of each charging pile module group is connected, using a switching device in the second switch group, to a negative input end of a charging terminal corresponding to the charging pile module group.

In an implementation, a negative input end of each charging terminal is separately connected to negative input ends of a plurality of other charging terminals using a plurality of switching devices in the third switch group, where a connection point of the switching device is located between the negative input end of the charging terminal and a corresponding switching device in the second switch group.

In an implementation, if any one of the charging terminals needs a plurality of charging pile module groups to be connected in series for output, a positive electrode of the first charging pile module group that participates in serial connection is used as a positive output end for serial-connection output, and a negative electrode of the last charging pile module group that participates in serial connection is used as a negative output end for serial-connection output; and the controller controls, to be closed, a switching device connected between a negative output end of a previous charging pile module group that participates in serial connection and a positive output end of a current charging pile module group that participates in serial connection; controls, to be closed, a switching device connected between a negative output end of the last charging pile module group that participates in serial connection and a negative input end of a corresponding charging terminal; controls, to be closed, a switching device connected between the negative output end for serial-connection output and a negative input end of the charging terminal that needs serial-connection output; and controls, to be opened, all other switching devices connected to the plurality of charging pile module groups that participate in serial connection.

In this implementation, the controller controls the closing and opening combination manner of the plurality of switching devices in the first switch group, the second switch group, and the third switch group, so that the plurality of charging pile module groups are connected in series and then configured for one of the charging terminals. Therefore, a maximum charging voltage can be obtained, to implement high-voltage charging for load, and this helps increase a charging speed.

In an implementation, a charging pile module group corresponding to the charging terminal that needs serial-connection output is the first charging pile module group that participates in serial connection.

In an implementation, if any one of the charging terminals needs a plurality of charging pile module groups to be connected in parallel for output, the controller controls, to be closed, a switching device connected between positive output ends of the plurality of charging pile module groups that participate in parallel connection; controls, to be closed, a switching device connected between negative output ends of the plurality of charging pile module groups that participate in parallel connection; controls, to be closed, switching devices connected between the negative output ends of the plurality of charging pile module groups that participate in parallel connection and negative input ends of corresponding charging terminals; and controls, to be opened, all other switching devices connected to the plurality of charging pile module groups that participate in parallel connection.

In this implementation, the controller controls the closing and opening combination manner of the plurality of switching devices in the first switch group, the second switch group, and the third switch group, so that the plurality of charging pile module groups are connected in parallel and then configured for one of the charging terminals. Therefore, a maximum charging current can be obtained, to implement high-current charging for load, and this helps increase a charging speed.

In an implementation, a negative output end of each charging pile module group is separately connected to negative output ends of a plurality of other charging pile module groups using a plurality of switching devices in the first switch group, and a positive output end of each charging pile module group is separately connected to the negative output ends of the plurality of other charging pile module groups using a plurality of switching devices in the first switch group, where a connection point that is of each switching device and is connected to the positive output end of the charging pile module group is located between the positive output end of the charging pile module group and a corresponding switching device in the second switch group.

In an implementation, the charging pile system includes N charging pile module groups and N charging terminals, a negative output end of any one of the N charging pile module groups is separately connected to negative output ends of the N−1 other charging pile module groups using N−1 switching devices, and a positive output end of the any one of the N charging pile module groups is separately connected to the negative output ends of the N−1 other charging pile module groups using N−1 switching devices.

In an implementation, the positive output end of each charging pile module group is connected, using a switching device in the second switch group, to a positive input end of a charging terminal corresponding to the charging pile module group.

In an implementation, a positive input end of each charging terminal is separately connected to positive input ends of a plurality of other charging terminals using a plurality of switching devices in the third switch group, where a connection point of the switching device is located between the positive input end of the charging terminal and a corresponding switching device in the second switch group.

In an implementation, if any one of the charging terminals needs a plurality of charging pile module groups to be connected in series for output, a positive electrode of the first charging pile module group that participates in serial connection is used as a positive output end for serial-connection output, and a negative electrode of the last charging pile module group that participates in serial connection is used as a negative output end for serial-connection output; and the controller controls, to be closed, a switching device connected between a negative output end of a previous charging pile module group that participates in serial connection and a positive output end of a current charging pile module group that participates in serial connection; controls, to be closed, a switching device connected between a positive output end of the first charging pile module group that participates in serial connection and a positive input end of a corresponding charging terminal; controls, to be closed, a switching device connected between the positive output end for serial-connection output and a positive input end of the charging terminal that needs serial-connection output; and controls, to be opened, all other switching devices connected to the plurality of charging pile module groups that participate in serial connection.

In this implementation, the controller controls the closing and opening combination manner of the plurality of switching devices in the first switch group, the second switch group, and the third switch group, so that the plurality of charging pile module groups are connected in series and then configured for one of the charging terminals. Therefore, a maximum charging voltage can be obtained, to implement high-voltage charging for load, and this helps increase a charging speed.

In an implementation, a charging pile module group corresponding to the charging terminal that needs serial-connection output is the last charging pile module group that participates in serial connection.

In an implementation, if any one of the charging terminals needs a plurality of charging pile module groups to be connected in parallel for output, the controller controls, to be closed, a switching device connected between positive output ends of the plurality of charging pile module groups that participate in parallel connection; controls, to be closed, a switching device connected between negative output ends of the plurality of charging pile module groups that participate in parallel connection; controls, to be closed, switching devices connected between the positive output ends of the plurality of charging pile module groups that participate in parallel connection and positive input ends of corresponding charging terminals; and controls, to be opened, all other switching devices connected to the plurality of charging pile module groups that participate in parallel connection.

In this implementation, the controller controls the closing and opening combination manner of the plurality of switching devices in the first switch group, the second switch group, and the third switch group, so that the plurality of charging pile module groups are connected in parallel and then configured for one of the charging terminals. Therefore, a maximum charging current can be obtained, to implement high-current charging for load, and this helps increase a charging speed.

BRIEF DESCRIPTION OF DRAWINGS

To describe technical solutions in embodiments of the present disclosure more clearly, the following describes the accompanying drawings required for describing other approaches and the embodiments of the present disclosure.

DESCRIPTION OF EMBODIMENTS

The following describes embodiments of the present disclosure with reference to accompanying drawings.

The embodiments of the present disclosure provide a charging pile system, so that a plurality of charging terminals in the charging pile system can obtain a plurality of output characteristics, and ranges of an output voltage and an output current that are output to each charging terminal are relatively large, to meet charging requirements of various electric vehicles having different capacities, different charging rates, and different charging voltages. When only some charging pile module groups need to be used for a charging terminal in the charging pile system, another charging pile module group may further provide output to another charging terminal, thereby improving system application flexibility. In addition, the charging pile system can further ensure that a charging pile module group at work always works at a power close to a rated power, thereby improving system utilization.

Figure 3:
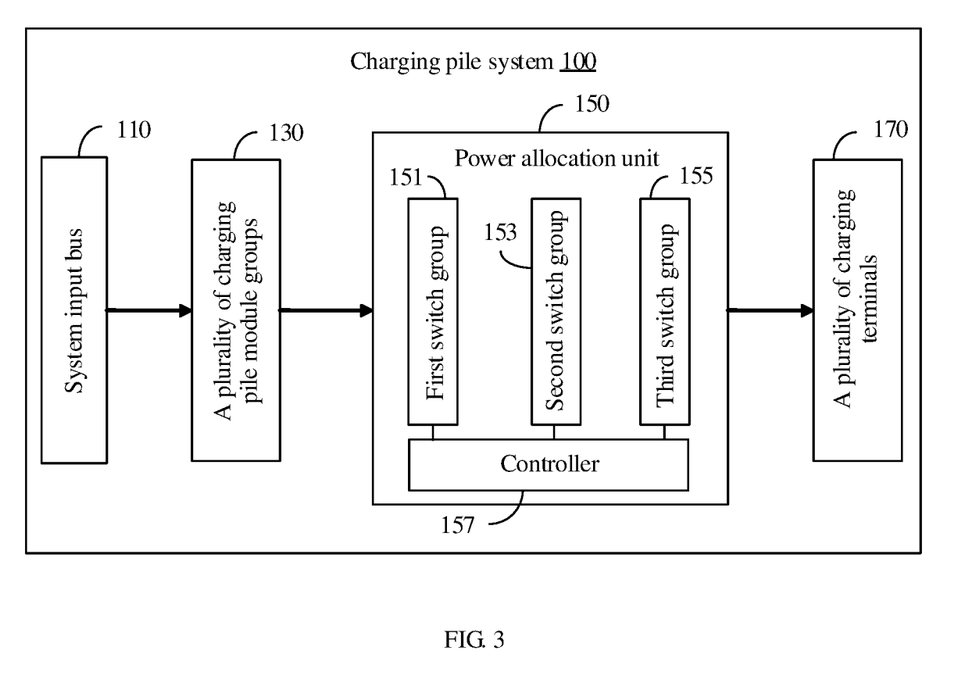
FIG. 3 is a first schematic structural diagram of a charging pile system according to an embodiment of the present disclosure.

Referring to FIG. 3, in an embodiment of the present disclosure, a charging pile system 100 is provided, including a system input bus 110, a plurality of charging pile module groups 130, a power allocation unit 150, and a plurality of charging terminals 170 corresponding to the plurality of charging pile module groups 130.

The system input bus 110 is connected to input ends of the plurality of charging pile module groups 130, and output ends of the plurality of charging pile module groups 130 are connected to input ends of the plurality of charging terminals 170 using the power allocation unit 150. The system input bus 110 is configured to be connected to an external power supply. The external power supply may be an alternating current power supply or a direct current power supply. Each charging pile module groups 130 may include a plurality of charging pile modules. It may be understood that, a quantity of charging pile module groups 130 included in the charging pile system 100 and a quantity of charging pile modules included in each charging pile module group 130 may be any natural number.

The power allocation unit 150 includes a first switch group 151, a second switch group 153, a third switch group 155, and a controller 157, and each switch group includes a plurality of switching devices. The switching device may be any type of device that can make a circuit closed or opened.

The switching devices in the first switch group 151 are connected between the output ends of the plurality of charging pile module groups 130, to configure at least two idle charging pile module groups of the plurality of charging pile module groups 130 to be connected in series or parallel for output. A switching device in the second switch group 153 separately connects the output ends of the plurality of charging pile module groups 130 to input ends of corresponding charging terminals 170. The switching devices in the third switch group 155 are connected between the input ends of the plurality of charging terminals 170. The second switch group 153 and the third switch group 155 are configured to connect an input end of any one of the charging terminals 170 and the charging pile module groups connected in series or parallel for output. In other words, the second switch group 153 and the third switch group 155 are configured to connect an input end of any one of the charging terminals 170 and an output end that is formed after the at least two idle charging pile module groups are connected in series or parallel.

The controller 157 is electrically connected to each of the first switch group 151, the second switch group 153, and the third switch group 155, to control a plurality of switching devices in the first switch group 151, the second switch group 153, and the third switch group 155 when any one of the plurality of charging terminals 170 requires a power greater than an output power of a corresponding charging pile module group 130, so that at least two idle charging pile module groups 130 of the plurality of charging pile module groups 130 are configured, through serial or parallel connection for output, for the charging terminal 170 that requires a power greater than the output power of the corresponding charging pile module group.

That the plurality of switching devices are combined to flexibly configure the plurality of charging pile module groups 130 for the plurality of charging terminals 170 through serial or parallel connection is as follows. A closing and opening combination manner of the plurality of switching devices is changed, so that the plurality of charging pile module groups 130 are connected in series, in parallel, or in series and parallel, to provide charging currents and charging voltages with different output characteristics for at least one of the plurality of charging terminals 170 based on different connection manners. Therefore, the charging pile system 100 can meet charging requirements of various electric vehicles having different capacities, different charging rates, and different charging voltages.

Figure 4:
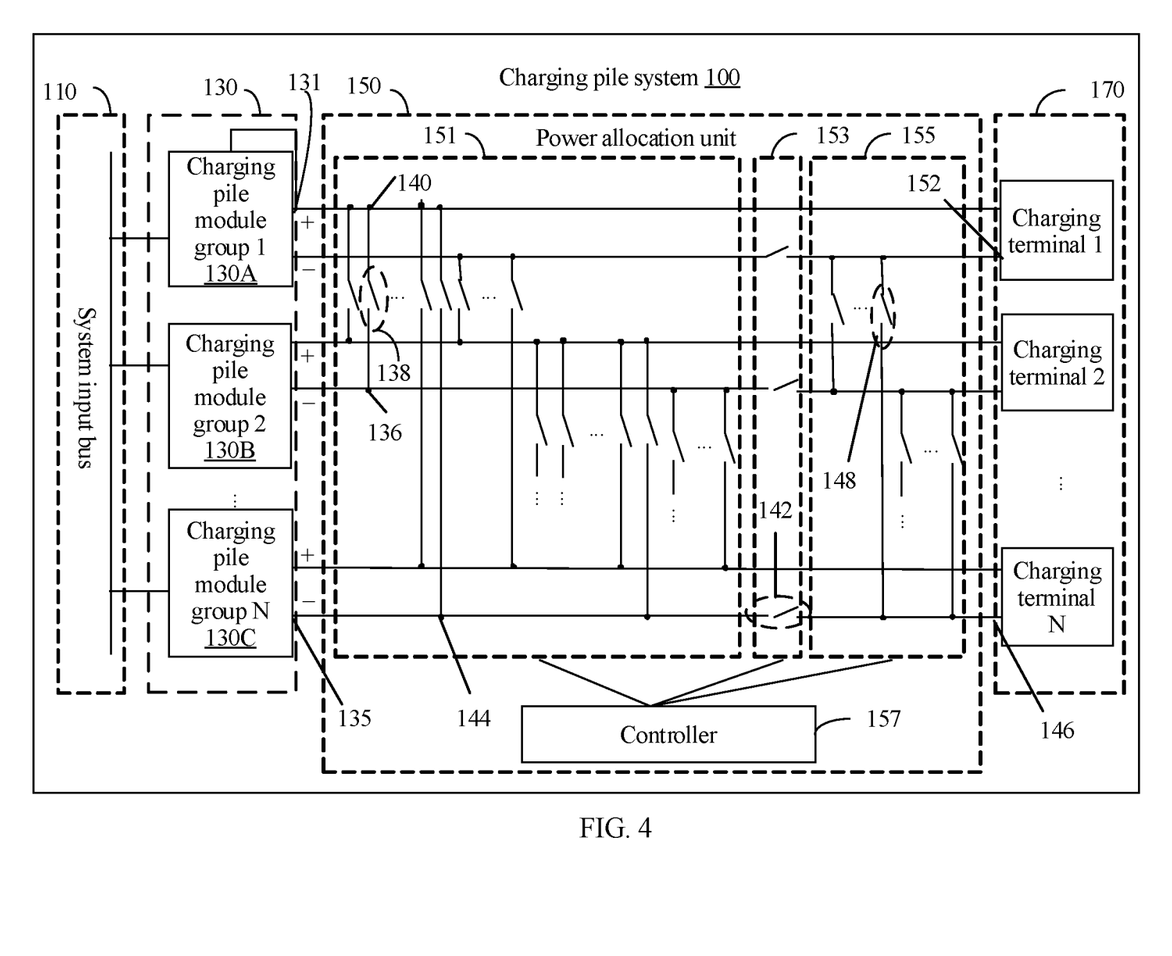
FIG. 4 is a second schematic structural diagram of a charging pile system according to an embodiment of the present disclosure.

Referring to FIG. 4, in an implementation, the charging pile system 100 includes N charging pile module groups 130 and N charging terminals 170. Connection relationships of the plurality of switching devices in the first switch group 151 are as follows. A positive output end of each charging pile module group 130 is separately connected to positive output ends of a plurality of other charging pile module groups 130 using a plurality of switching devices in the first switch group 151. In this implementation, a positive output end of any one of the N charging pile module groups 130 is separately connected to positive output ends of the N−1 other charging pile module groups 130 using N−1 switching devices. The positive output end of each charging pile module group 130 is further separately connected to negative output ends of the plurality of other charging pile module groups 130 using a plurality of switching devices in the first switch group 151. In this implementation, the positive output end of the any one of the N charging pile module groups 130 is further separately connected to negative output ends of the N−1 other charging pile module groups 130 using N−1 switching devices. A connection point that is of each switching device and is connected to a negative output end of the charging pile module group 130 is located between the negative output end of the charging pile module group 130 and a corresponding switching device in the second switch group 153.

Connection relationships of the plurality of switching devices in the second switch group 153 are as follows. The negative output end of each charging pile module group 130 is connected, using a switching device in the second switch group 153, to a negative input end of a charging terminal 170 corresponding to the charging pile module group 130. The charging terminal 170 corresponding to the charging pile module group 130 is a charging terminal 170 whose positive input end is directly connected to the positive output end of the charging pile module group 130. For example, in FIG. 4, a charging pile module group 1 corresponds to a charging terminal 1.

Connection relationships of the plurality of switching devices in the third switch group 155 are as follows. A negative input end of each charging terminal 170 is separately connected to negative input ends of a plurality of other charging terminals 170 using a plurality of switching devices in the third switch group 155. In this implementation, a negative input end of any one of the N charging terminals 170 is separately connected to negative input ends of the N−1 other charging terminals 170 using N−1 switching devices. A connection point of the switching device in the third switch group 155 is located between the negative input end of the charging terminal 170 and a corresponding switching device in the second switch group 153.

In this implementation, if any one of the charging terminals 170 needs a plurality of charging pile module groups 130 to be connected in series for output, a positive electrode 131 of the first charging pile module group 130A that participates in serial connection is used as a positive output end for serial-connection output, and a negative electrode 135 of the last charging pile module group 130C that participates in serial connection is used as a negative output end for serial-connection output. The controller 157 controls, to be closed, a switching device 138 connected between a negative output end 136 of a previous charging pile module group 130B that participates in serial connection and a positive output end 140 of a current charging pile module group 130A that participates in serial connection; controls, to be closed, a switching device 142 connected between a negative output end 144 of the last charging pile module group 130C that participates in serial connection and a negative input end 146 of a corresponding charging terminal 170; controls, to be closed, a switching device 148 connected between the negative output end (namely, a negative input end 146 of a charging terminal 170 corresponding to the last charging pile module group 130C that participates in serial connection) for serial-connection output and a negative input end 152 of the charging terminal 170 that needs serial-connection output; and controls, to be opened, all other switching devices connected to the plurality of charging pile module groups that participate in serial connection. It may be understood that, a charging pile module group 130 corresponding to the charging terminal 170 that needs serial-connection output is the first charging pile module group 130A that participates in serial connection.

If any one of the charging terminals 170 needs a plurality of charging pile module groups 130 to be connected in parallel for output, the controller 157 controls, to be closed, a switching device connected between positive output ends of the plurality of charging pile module groups 130 that participate in parallel connection; controls, to be closed, a switching device connected between negative output ends of the plurality of charging pile module groups 130 that participate in parallel connection; controls, to be closed, switching devices connected between the negative output ends of the plurality of charging pile module groups 130 that participate in parallel connection and negative input ends of corresponding charging terminals 170; and controls, to be opened, all other switching devices connected to the plurality of charging pile module groups that participate in parallel connection.

In this implementation, the controller 157 controls the plurality of switching devices in the first switch group 151, the second switch group 153, and the third switch group 155 to be closed or opened. In this way, the N charging pile module groups 130 may be all connected in parallel and then configured for one of the charging terminals 170, to obtain a maximum charging current. Alternatively, the N charging pile module groups 130 may be all connected in series and then configured for one of the charging terminals 170, to obtain a maximum charging voltage. Alternatively, the N charging pile module groups 130 may be connected in series and parallel and then configured for one of the charging terminals 170, to obtain a charging current and a charging voltage that meet a load requirement. Alternatively, some of the N charging pile module groups 130 may be connected in series, in parallel, or in series and parallel and then configured for one of the charging terminals 170, and some others of the N charging pile module groups 130 are connected in series, in parallel, or in series and parallel and then configured for other charging terminals 170. It may be understood that, a combination manner of the N charging pile module groups 130 is not limited to the foregoing examples, and may further be any combination manner that can be obtained through allocation of the power allocation unit 150.

Figure 5:
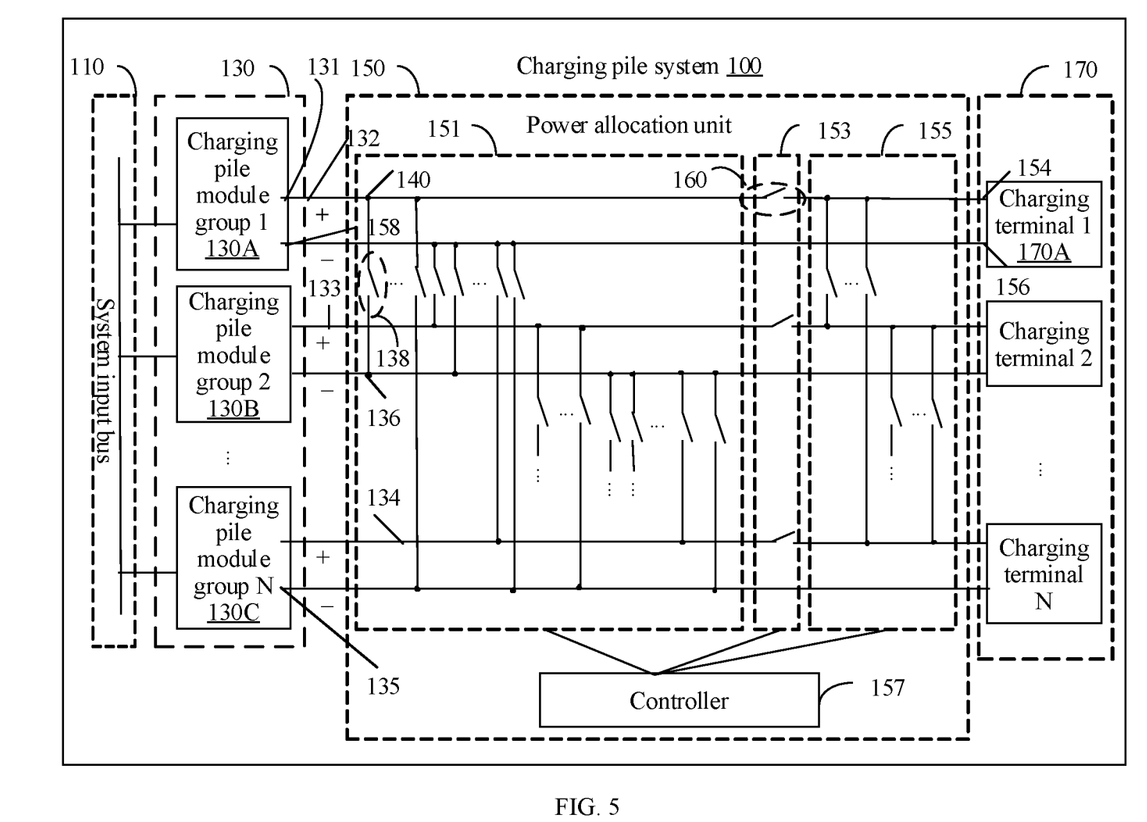
FIG. 5 is a third schematic structural diagram of a charging pile system according to an embodiment of the present disclosure.

Referring to FIG. 5, in an implementation, the charging pile system 100 includes N charging pile module groups 130 and N charging terminals 170. Connection relationships of the plurality of switching devices in the first switch group 151 are as follows. A negative output end of each charging pile module group 130 is separately connected to negative output ends of a plurality of other charging pile module groups using a plurality of switching devices in the first switch group 151. In this implementation, a negative output end of any one of the N charging pile module groups 130 is separately connected to negative output ends of the N−1 other charging pile module groups 130 using N−1 switching devices. A positive output end of each charging pile module group 130 is separately connected to the negative output ends of the plurality of other charging pile module groups 130 using a plurality of switching devices in the first switch group 151. In this implementation, a positive output end of the any one of the N charging pile module groups 130 is separately connected to the negative output ends of the N−1 other charging pile module groups 130 using N−1 switching devices. A connection point that is of each switching device and is connected to the positive output end of the charging pile module group 130 is located between the positive output end of the charging pile module group 130 and a corresponding switching device in the second switch group 153.

Connection relationships of the plurality of switching devices in the second switch group 153 are as follows. The positive output end 132, 133 and 134 of each respective charging pile module group 130A, 130B and 130C is connected, using a switching device 160 in the second switch group 153, to a positive input end 154 of a charging terminal 170 corresponding to the charging pile module group 130. The charging terminal 170 corresponding to the charging pile module group 130 is a charging terminal 170 whose negative input end 156 is directly connected to the negative output end 158 of the charging pile module group 130. For example, in FIG. 5, a charging pile module group 1 130A corresponds to a charging terminal 1 170A.

Connection relationships of the plurality of switching devices in the third switch group 155 are as follows. A positive input end of each charging terminal 170 is separately connected to positive input ends of a plurality of other charging terminals 170 using a plurality of switching devices in the third switch group 155. In this implementation, a positive input end of any one of the N charging terminals 170 is separately connected to positive input ends of the N−1 other charging terminals 170 using N−1 switching devices. A connection point of the switching device in the third switch group 155 is located between the positive input end of the charging terminal 170 and a corresponding switching device in the second switch group 153.

In this implementation, if any one of the charging terminals 170 needs a plurality of charging pile module groups 130 to be connected in series for output, a positive electrode 131 of the first charging pile module group 130A that participates in serial connection is used as a positive output end for serial-connection output, and a negative electrode 135 of the last charging pile module group 130C that participates in serial connection is used as a negative output end for serial-connection output. The controller 157 controls, to be closed, a switching device 138 connected between a negative output end 136 of a previous charging pile module group 130B that participates in serial connection and a positive output end 140 of a current charging pile module group 130A that participates in serial connection; controls, to be closed, a switching device 160 connected between a positive output end 140 of the first charging pile module group 130A that participates in serial connection and a positive input end 154 of a corresponding charging terminal 170A; controls, to be closed, a switching device connected between the positive output end (namely, a positive input end 131 of a charging terminal corresponding to the first charging pile module group 130A that participates in serial connection) for serial-connection output and a positive input end of the charging terminal 170 that needs serial-connection output; and controls, to be opened, all other switching devices connected to the plurality of charging pile module groups that participate in serial connection. It may be understood that, a charging pile module group corresponding to the charging terminal that needs serial-connection output is the last charging pile module group that participates in serial connection.

If any one of the charging terminals 170 needs a plurality of charging pile module groups 130 to be connected in parallel for output, the controller 157 controls, to be closed, a switching device connected between positive output ends of the plurality of charging pile module groups 130 that participate in parallel connection; controls, to be closed, a switching device connected between negative output ends of the plurality of charging pile module groups 130 that participate in parallel connection; controls, to be closed, switching devices connected between the positive output ends of the plurality of charging pile module groups 130 that participate in parallel connection and positive input ends of corresponding charging terminals 170; and controls, to be opened, all other switching devices connected to the plurality of charging pile module groups that participate in parallel connection.

It may be understood that, in this implementation, the controller 157 controls the plurality of switching devices in the first switch group 151, the second switch group 153, and the third switch group 155 to be closed or opened. In this way, the N charging pile module groups 130 can also be configured for at least one of the charging terminals 170 through serial connection, parallel connection, or serial and parallel connection. For details, refer to related descriptions in the implementation shown in FIG. 4. Details are not described herein again.

Figure 6:
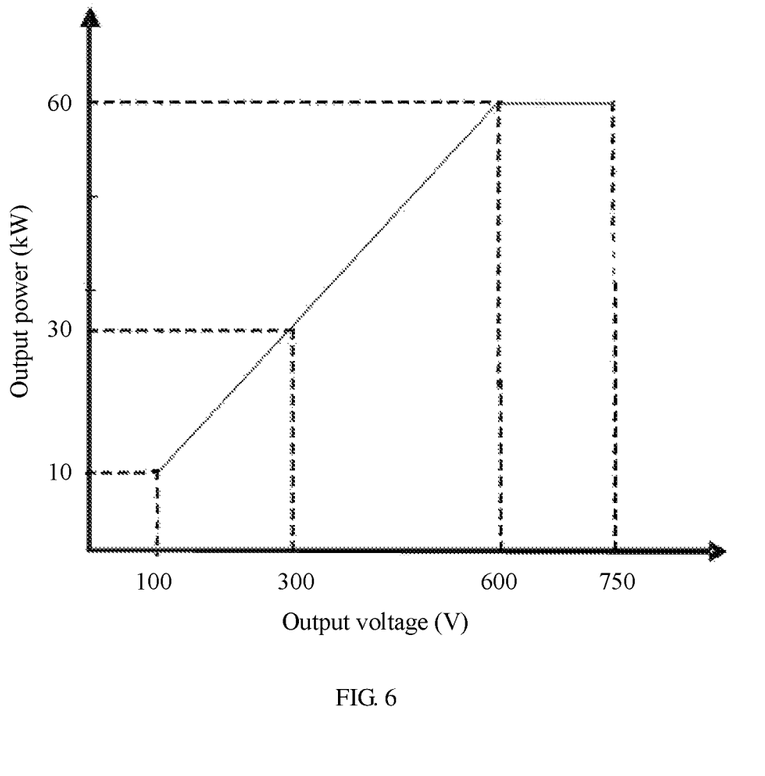
FIG. 6 is an output characteristic diagram of a charging pile module group whose optimum output power performance is 750 V/60 kW.

It may be understood that, a 750 V/60 KW charging pile module group may include four 750 V/15 kW charging pile modules having an output characteristic shown in FIG. 2, and an output characteristic of the 750 V/60 KW charging pile module group is shown in FIG. 6. The 750 V/60 kW charging pile module group may output a rated power 60 kW when charging an electric vehicle having a charging voltage 600 V to 750 V. However, when an electric vehicle having a charging voltage 300 V is charged, an output power is linearly decreased to 30 kW, causing excessively low utilization of the charging pile power unit and a resource waste.

Figure 7:
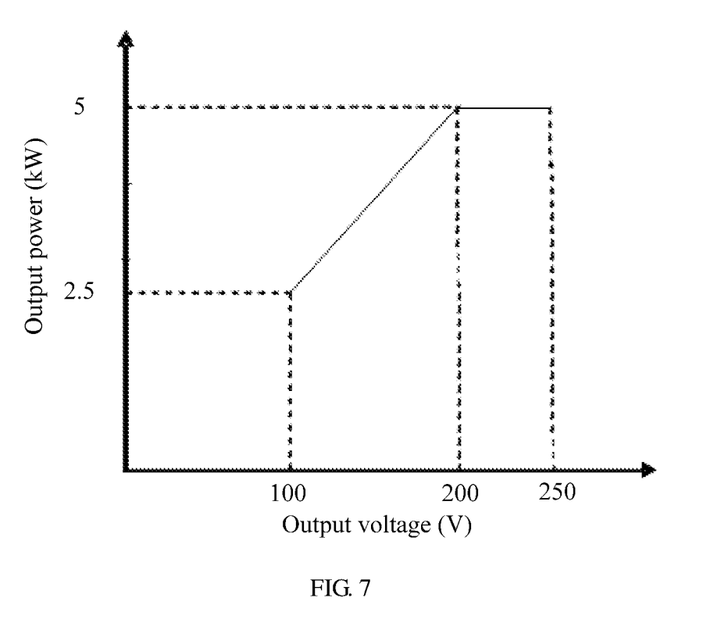
FIG. 7 is an output characteristic diagram of a charging pile module in a charging pile system according to an embodiment of the present disclosure.

To resolve the foregoing problem, in an implementation, the 750 V/15 kW charging pile module having the output characteristic shown in FIG. 2 is divided into three 250 V/5 kW charging pile modules having a same-proportion output characteristic, and the output characteristic of the 250 V/5 kW charging pile module is shown in FIG. 7. The same-proportion output characteristic is as follows. Both maximum and minimum output voltages of the 250 V/5 kW charging pile module are ⅓ of those of the 750 V/15 kW charging pile module, a maximum output power when a maximum rated voltage is output is ⅓ of that of the 750 V/15 kW charging pile module, maximum and minimum voltages during work at a constant power are ⅓ of those of the 750 V/15 kW charging pile module, and after an output voltage is decreased to the minimum output voltage at the constant power, a proportional relationship between a power decrease and the output voltage is the same as that of the 750 V/15 kW charging pile module.

Figure 8:
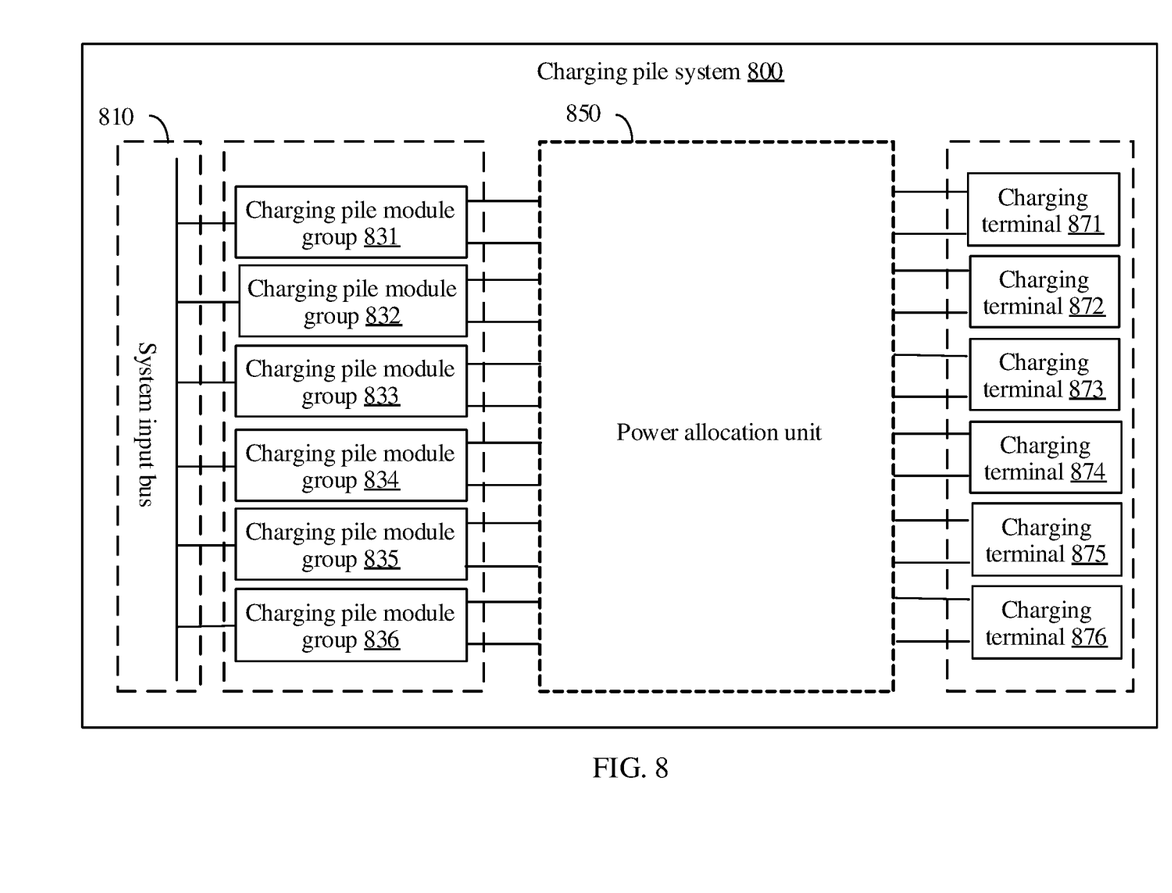
FIG. 8 is a fourth schematic structural diagram of a charging pile system according to an embodiment of the present disclosure.

Referring to FIG. 8, in an embodiment of the present disclosure, a charging pile system 800 is provided, including a system input bus 810, six charging pile module groups 831 to 836, a power allocation unit 850, and six charging terminals 871 to 876 corresponding to the six charging pile module groups 831 to 836. Each charging pile module group includes two parallel-connected 250 V/5 kW charging pile modules having the output characteristic shown in FIG. 7. For connection relationships between components of the charging pile system 800 and a structure of the power allocation unit 850, refer to descriptions in the embodiment shown in FIG. 4 or FIG. 5.

It may be understood that, the power allocation unit 850 may flexibly configure the six charging pile module groups 831 to 836 for output to the six charging terminals 871 to 876 through serial connection, parallel connection, or serial and parallel connection. For example, when all the charging pile module groups 831 to 836 are configured for the charging terminal 1, the power allocation unit 850 may configure the six charging pile module groups 831 to 836 in the following manners.

Manner 1: All the six charging pile module groups 831 to 836 are connected in parallel for output to the charging terminal 871.

Manner 2: The charging pile module groups 831, 832, and 833 are connected in parallel, the charging pile module groups 834, 835, and 836 are connected in parallel, and then the two parallel connection subsystems are connected in series for output to the charging terminal 871.

Manner 3: The charging pile module groups 831 and 832 are connected in parallel, the charging pile module groups 833 and 834 are connected in parallel, the charging pile module groups 835 and 836 are connected in parallel, and then the three parallel connection subsystems are connected in series for output to the charging terminal 871.

Manner 4: All the six charging pile module groups 831 to 836 are connected in series for output to the charging terminal 1.

Figure 9:
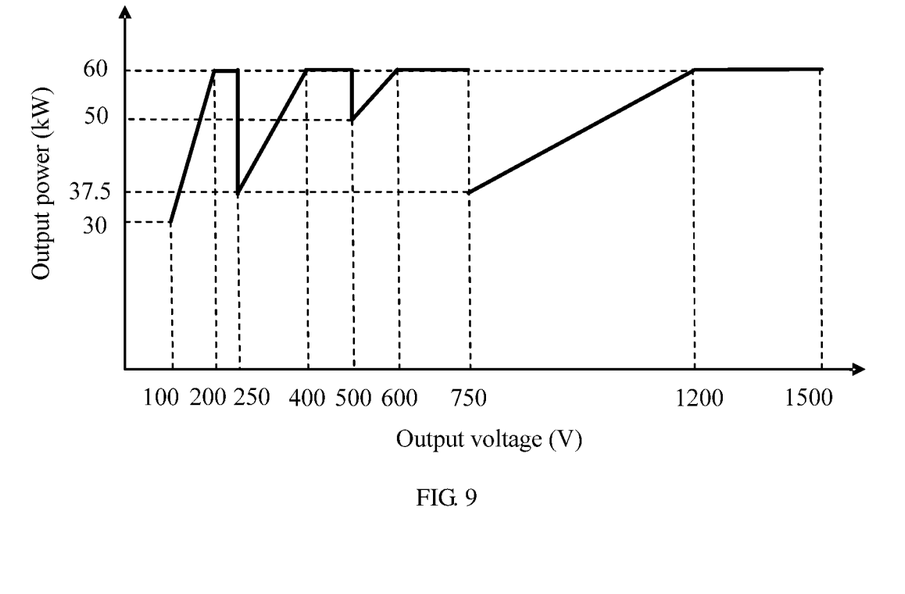
FIG. 9 is an output characteristic diagram of a charging pile system according to an embodiment of the present disclosure.

Referring to FIG. 9, in the foregoing four configuration manners 1 to 4, the charging terminal 871 may obtain an output characteristic shown in FIG. 9.

Through comparison between FIG. 9 and FIG. 6, it can be learned that an output power when an output voltage is 100 V to 500 V in FIG. 9 is much greater than that in FIG. 6. In addition, in FIG. 9, the output voltage may further be increased to 1500 V, and a rated power 60 kW can be output at 1200 V to 1500 V.

In addition to the foregoing four configuration manners 1 to 4, an output configuration manner of the charging pile system 800 shown in FIG. 8 may further include any possible manner obtained through allocation of the power allocation unit 850. For example, when only the charging pile module group 831 and the charging pile module group 832 need to be used for the charging terminal 871, the charging pile module group 833 to the charging pile module group 836 can be configured for the charging terminal 873 to the charging terminal 876 through separate output or serial and parallel connection for output.

In the charging pile system provided in the embodiments of the present disclosure, the power allocation unit is disposed, so that any quantity of charging pile module groups in the charging pile system can be configured for a charging terminal through parallel connection, serial connection, or serial and parallel connection, to obtain a plurality of output characteristics. Therefore, ranges of an output voltage and an output current that are output to each charging terminal can be effectively increased, to meet charging requirements of various electric vehicles having different capacities, different charging rates, and different charging voltages. In addition, when only some charging pile module groups need to be used for a charging terminal in the charging pile system, another charging pile module group may further provide output to another charging terminal, thereby improving system application flexibility.

What is claimed is:
1. A charging pile system, comprising:
a system input bus;
a plurality of charging pile circuit groups coupled to the system input bus, wherein the system input bus is coupled to respective input ends of the plurality of charging pile circuit groups;
a power allocation unit coupled to the plurality of charging pile circuit groups, wherein the power allocation unit comprises a first switch group, a second switch group coupled to the first switch group, a third switch group coupled to the second switch group, and a controller coupled to the first switch group, the second switch group and the third switch group, wherein the first switch group comprises a plurality of first switching devices, wherein the second switch group comprises a plurality of second switching devices, and wherein the third switch group comprises a plurality of third switching devices, wherein the plurality of first switching devices are coupled to respective output ends of the plurality of charging pile circuit groups so as to configure at least two idle charging pile circuit groups to be coupled either in series or in parallel to provide a first output; and a plurality of charging terminals coupled to the power allocation unit, wherein the plurality of charging terminals correspond to the plurality of charging pile circuit groups, wherein the respective output ends of the plurality of charging pile circuit groups are coupled to respective input ends of a corresponding charging terminal using the power allocation unit, wherein a serially connected switching device in the second switch group separately and directly couples the respective output ends of the plurality of charging pile circuit groups to the respective input ends of the corresponding charging terminal, wherein the third switching devices are coupled to the respective input ends of the corresponding charging terminal, wherein each of the second switch group and the third switch group is configured to couple an input end of any of the charging terminals in series or in parallel to provide a second output to the charging pile circuit groups, and wherein the controller is electrically coupled to each of the first switch group, the second switch group, and the third switch group, wherein the controller is configured to selectively couple to control each of the plurality of first switching devices, the plurality of second switching devices, and the plurality of third switching devices such that at least two idle charging pile circuit groups are configured to be in serial connection or parallel connection to provide an output power to any of the charging terminals when any of the charging terminals requires the output power that exceeds a power of a corresponding charging pile circuit group.

2. The charging pile system of claim 1, wherein a positive output end of each charging pile circuit group of the charging pile circuit groups is separately coupled to another positive output end of another charging pile circuit group using the first switching devices, wherein the positive output end of each charging pile circuit group is separately coupled to a negative output end of the other charging pile circuit group using the first switching devices, and wherein a connection point of each switching device that is coupled to the negative output end of each of the charging pile circuit groups is located between the negative output end of each of the charging pile circuit groups and a corresponding switching device in the second switch group.

3. The charging pile system of claim 1, wherein a negative output end of each charging pile circuit group is separately coupled to negative output ends of other charging pile circuit groups using the plurality of first switching devices, wherein a positive output end of each of the charging pile circuit groups is separately coupled to the negative output ends of the other charging pile circuit groups using the plurality of first switching devices, wherein a connection point of each of the first switching devices that is coupled to positive output ends of the plurality of charging pile circuit groups is located between the positive output ends of the plurality of charging pile circuit groups and a corresponding switching device in the second switch group.

4. The charging pile system of claim 1, wherein a positive output end of each charging pile circuit group is coupled to a first positive input end of a charging terminal that corresponds to a charging pile circuit group using a switching device in the second switch group.

5. The charging pile system of claim 4, wherein each second positive input end of the plurality of charging terminals is separately coupled to second positive input ends of other charging terminals using the plurality of third switching devices, wherein a connection point of the plurality of third switching devices is located between each of the second positive input ends of the plurality of charging terminals and a corresponding switching device in the second switch group.

6. The charging pile system of claim 5, wherein when any one of the plurality of charging terminals needs the plurality of charging pile circuit groups to be coupled in parallel to provide an output, the controller is configured to:

control a first switching device coupled between positive output ends of the plurality of charging pile circuit groups that participate in a first parallel connection to be closed;

control a second switching device coupled between negative output ends of the plurality of charging pile circuit groups that participate in a second parallel connection to be closed;

control a plurality of switching devices coupled between the positive output ends of the plurality of charging pile circuit groups that participate in the first parallel connection and positive input ends of corresponding charging terminals to be closed; and control all of the other switching devices coupled to the plurality of charging pile circuit groups that participate in parallel connections to be opened.

7. The charging pile system of claim 5, wherein a positive electrode of a first charging pile circuit group that participates in a first serial connection is used as a first positive output end for a first serial-connection output when any of the plurality of charging terminals needs the plurality of charging pile circuit groups to be coupled in series to provide a third output, wherein a negative electrode of a last charging pile circuit group that participates in a second serial connection is used as a first negative output end for a second serial-connection output; and wherein the controller is configured to:

control a switching device coupled between a second negative output end of a previous charging pile circuit group that participates in a third serial connection and a second positive output end of a current charging pile circuit group that participates in a fourth serial connection to be closed;

control a switching device coupled between the first positive output end of the first charging pile circuit group that participates in the first serial connection and a second positive input end of a corresponding charging terminal to be closed;

control a switching device coupled between the first positive output end of the first charging pile circuit group for the first serial-connection output and a second positive input end of the charging terminal that needs the first serial-connection output to be closed; and control all other switching devices coupled to the plurality of charging pile circuit groups that participate in a third serial connection to be opened.

8. The charging pile system of claim 7, wherein a charging pile circuit group that corresponds to the charging terminal that needs the first serial-connection output is the last charging pile circuit group that participates in a serial connection.

9. The charging pile system of claim 1, wherein a first negative output end of each of the charging pile circuit groups is coupled to a first negative input end of a charging terminal that corresponds to a charging pile circuit group using a switching device in the second switch group.

10. The charging pile system of claim 9, wherein a second negative input end of each charging terminal is separately coupled to negative input ends of other charging terminals using the plurality of third switching devices, and wherein a connection point of each of the plurality of third switching devices is located between the first negative input end of the charging terminal that corresponds to the charging pile circuit group and a corresponding switching device in the second switch group.

11. The charging pile system of claim 10, wherein a positive electrode of a first charging pile circuit group that participates in a first serial connection is used as a first positive output end for a serial-connection output when any of the plurality of charging terminals needs the plurality of charging pile circuit groups to be coupled in series to provide a third output, wherein a negative electrode of a last charging pile circuit group of the plurality of charging pile circuit groups that participates in a second serial connection is used as a second negative output end for the serial-connection output, and wherein the controller is configured to control a switching device coupled between the second negative output end of the last charging pile circuit group that participates in the second serial connection and a second negative input end of a corresponding charging terminal to be closed.

12. The charging pile system of claim 10, wherein a positive electrode of a first charging pile circuit group that participates in a first serial connection is used as a first positive output end for a serial-connection output when any of the plurality of charging terminals needs the plurality of charging pile circuit groups to be coupled in series to provide a third output, wherein a negative electrode of a last charging pile circuit group of the plurality of charging pile circuit groups that participates in a second serial connection is used as a second negative output end for the serial-connection output, and wherein the controller is configured to control a switching device coupled between the second negative output end for the serial-connection output and a second negative input end of the charging terminal that needs the serial-connection output to be closed.

13. The charging pile system of claim 10, wherein a positive electrode of a first charging pile circuit group that participates in a first serial connection is used as a first positive output end for a serial-connection output when any of the plurality of charging terminals needs the plurality of charging pile circuit groups to be coupled in series to provide a third output, wherein a negative electrode of a last charging pile circuit group of the plurality of charging pile circuit groups that participates in a second serial connection is used as a second negative output end for the serial-connection output, and wherein the controller is configured to control all other switching devices coupled to the plurality of charging pile circuit groups that participate in a serial connection to be opened.

14. The charging pile system of claim 10, wherein when any one of the plurality of charging terminals needs the plurality of charging pile circuit groups to be coupled in parallel to provide a third output, the controller is configured to:
  control a first switching device coupled between positive output ends of the plurality of charging pile circuit groups that participate in a first parallel connection to be closed;
  control a second switching device coupled between negative output ends of the plurality of charging pile circuit groups that participate in a second parallel connection to be closed;
  control a plurality of switching devices coupled between the negative output ends of the plurality of charging pile circuit groups that participate in the second parallel connection and negative input ends of corresponding charging terminals to be closed; and
  control all of the other switching devices coupled to the plurality of charging pile circuit groups that participate in parallel connections to be opened.

15. The charging pile system of claim 10, wherein a positive electrode of a first charging pile circuit group of the plurality of charging pile circuit groups that participates in a first serial connection is used as a first positive output end for a serial-connection output when any of the plurality of charging terminals needs the plurality of charging pile circuit groups to be coupled in series to provide a third output, wherein a negative electrode of a last charging pile circuit group of the plurality of charging pile circuit groups that participates in a second serial connection is used as a second negative output end for a serial-connection output, and wherein the controller is configured to control a switching device coupled between a third negative output end of a previous charging pile circuit group that participates in a third serial connection and a second positive output end of a current charging pile circuit group that participates in the serial connection to be closed.

16. The charging pile system of claim 15, wherein a charging pile circuit group of the plurality of charging pile circuit groups that corresponds to the charging terminal that needs the serial-connection output is the first charging pile circuit group that participates in the first serial connection.

* * * * *